United States Patent [19]

Kathiria

[11] 4,453,759

[45] Jun. 12, 1984

[54] FLOOR CONSOLE WITH LATCHABLE SLIDING TRAY

[75] Inventor: Shabbir A. Kathiria, Sterling Heights, Mich.

[73] Assignee: Ford Motor Company, Dearborn, Mich.

[21] Appl. No.: 375,112

[22] PCT Filed: Mar. 26, 1982

[86] PCT No.: PCT/US82/00372

§ 371 Date: Mar. 26, 1982

§ 102(e) Date: Mar. 26, 1982

[87] PCT Pub. No.: WO83/03392

PCT Pub. Date: Oct. 13, 1983

[51] Int. Cl.³ .............................................. B60R 7/00
[52] U.S. Cl. .................................... 296/37.8; 220/23; 108/44
[58] Field of Search ................. 296/24 R, 37.8, 37.12, 296/37.9; 224/42.42, 42.4, 42.11, 42.32, 275, 273, 277; 206/562; 220/18, 23; 108/45, 44; 312/209; 297/194

[56] References Cited

U.S. PATENT DOCUMENTS

| | | | |
|---|---|---|---|
| 3,163,287 | 12/1964 | Barnett | 224/42.42 |
| 3,215,467 | 11/1965 | McFarland | 297/194 |
| 3,356,409 | 12/1967 | Belsky | 296/24 R |
| 3,497,076 | 2/1970 | O'Brien | 297/194 |
| 3,561,589 | 2/1971 | Larkin, Jr. | 224/42.11 |
| 3,606,112 | 9/1971 | Cheshier | 108/45 |
| 3,804,233 | 4/1974 | Gregg, Jr. | 224/42.32 |
| 3,899,982 | 8/1975 | Fetzek | 108/45 |
| 4,146,159 | 3/1979 | Hemmen | 224/275 |
| 4,262,962 | 4/1981 | Yust | 297/194 |

Primary Examiner—Robert R. Song
Attorney, Agent, or Firm—Daniel M. Stock; Clifford L. Sadler

[57] ABSTRACT

An improved floor console (10) for automobiles is provided in which is mounted an article-carrying tray (18) slidably moveable between an exposed operative position and a concealed storage position at which the tray (18) is held by operation of a latch assembly (42). The latch assembly (42) is operative to release the tray (18) after certain inward movement beyond the stored position, and a spring (44) operatively disposed between the tray (18) and a housing (22) of the console (10) assists movement of the tray (18) to the operative position.

14 Claims, 9 Drawing Figures

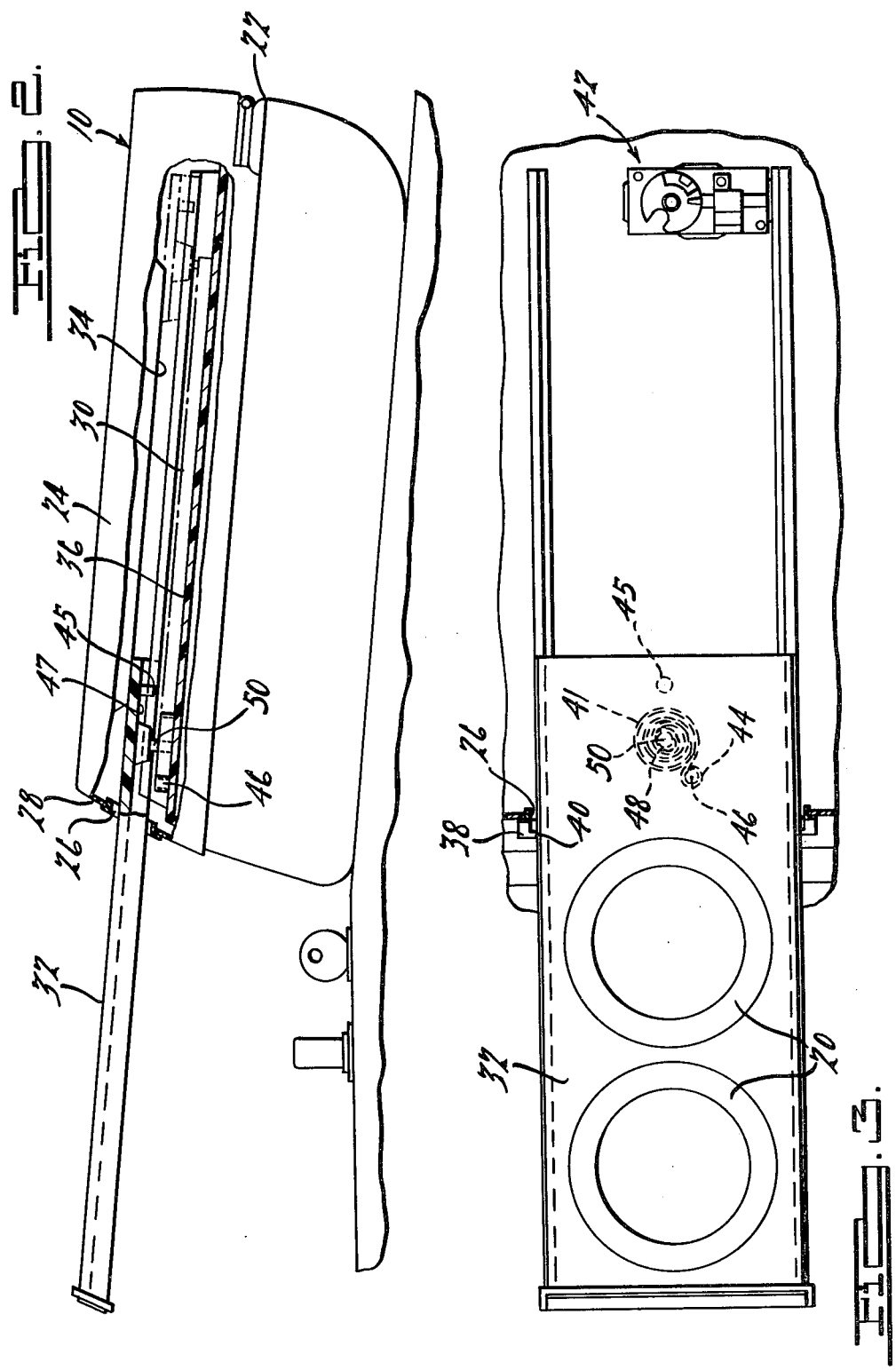

FLOOR CONSOLE WITH LATCHABLE SLIDING TRAY

TECHNICAL FIELD

The present invention relates generally to floor consoles for automobiles and more particularly to such consoles including article-carrying trays and to the mounting of such trays in automobile passenger compartments.

BACKGROUND ART

It is well known in the automobile body arts to provide for the mounting of trays or other receptacles in the passenger compartment of an automobile to permit relatively stable support of items of food and drink and other small articles.

Some such trays or receptacles have been carried with storage structures known as floor consoles which are positioned between the two front seats of automobiles having bucket seats. Exemplary of such trays and receptacles are those disclosed in U.S. Pat. No. 3,356,409 to Belsky et al, U.S. Pat. No. 3,110,397 to Peck et al, U.S. Pat. Nos. 3,136,461 and 3,804,233 to Gregg, Jr., and U.S. Pat. No. 3,561,589 to Larkin.

Others have provided for the detachable securing of beverage trays and the like to other passenger compartment structures, such as the seats, as exemplified by U.S. Pat. No. 3,338,629 to Drees and U.S. Pat. No. 4,146,159 to Hemmen, or to the dashboard as exemplified by U.S. Pat. No. 4,286,742 to Pellegrino.

Among the deficiencies noted in all the prior art devices is that the article-carrying trays have used valuable interior space and usable surfaces in the passenger compartment to perform a function for which demand is intermittent. This deficiency is seen whether the article-carrying trays are included in auxiliary structures which by their nature consume otherwise useful space and surface or are integrally formed on existing structure such as floor consoles.

DISCLOSURE OF THE INVENTION

Responsive to the deficiencies in the prior art, the present invention provides an improved floor console having a housing attachable to the floor of a vehicle body between a pair of seats and having a tray carried with the housing and slidingly moveable between a storage position enclosed in the housing and an operative position exposed for use.

Movement between the two positions of the tray is facilitiated by a novel spring assembly operatively carried between the tray and the housing, and secure positioning of the tray in the storage position is effected through a new axially actuated rotary latch mechanism.

BRIEF DESCRIPTION OF THE DRAWINGS

The present invention can be understood by reading the following description of the best mode for carrying out the invention with reference to the accompanying sheets of drawings in which:

FIG. 2 is a side view of the invention console partially sectioned to show its tray in stored and operative positions;

FIG. 3 is a top view of the invention console with the tray in its operative position, certain portions removed for clearly showing spring and latch configuration;

BEST MODE FOR CARRYING OUT THE INVENTION

Figure 1:
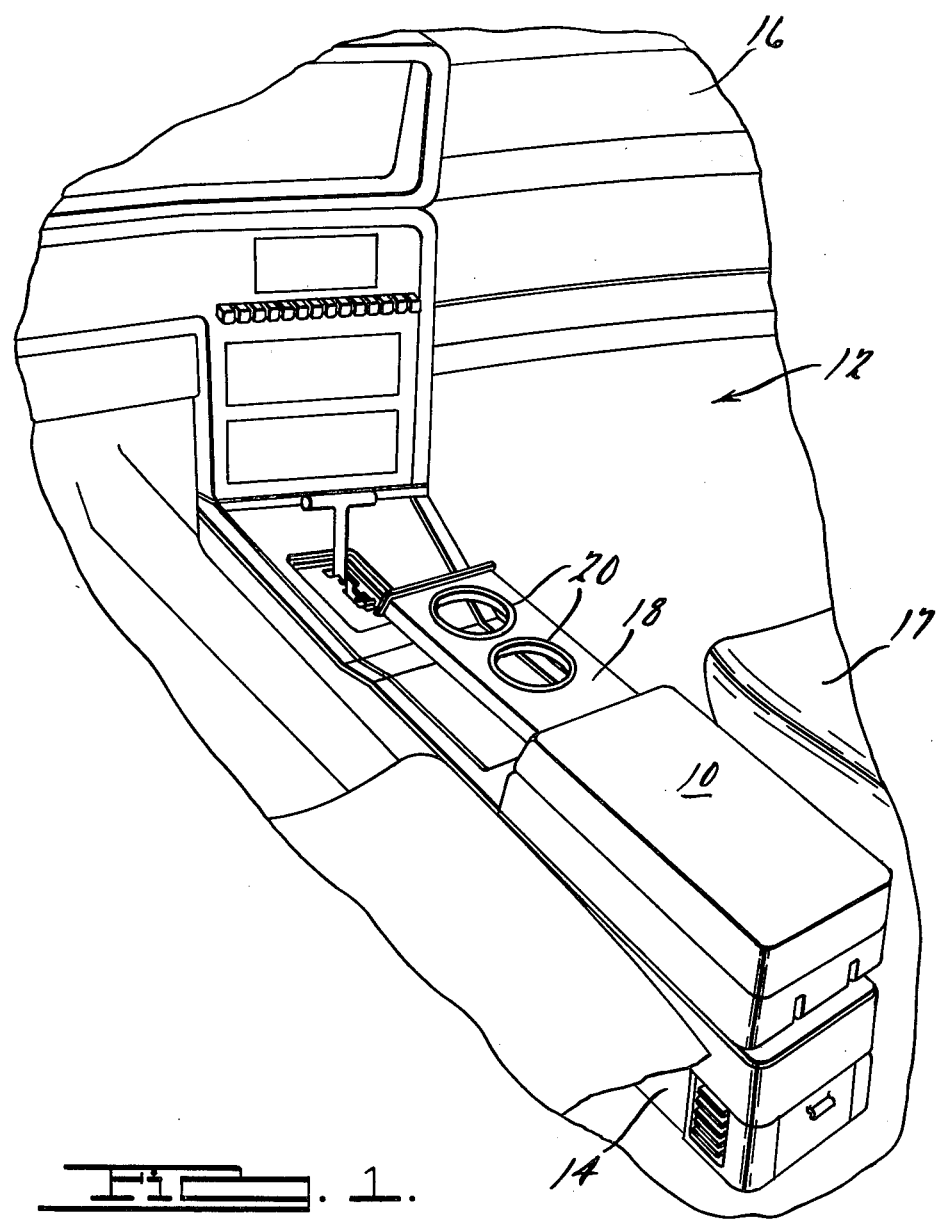
FIG. 1 is a perspective view of the improved console of the present invention installed in the passenger compartment of an automobile.

Turning now to the drawings, and in particular to FIG. 1, a floor console 10 is illustrated as being installed in the passenger compartment 12 of a vehicle. The console 10 is secured to a floor portion 14 of the vehicle body and extends axially rearwardly from a position adjacent the dashboard shown in part at 16 between a pair of spaced seats (one indicated at 17). An article-carrying tray member 18 is illustrated in its operative position extending forwardly from the console 10 toward the dashboard 16. A plurality (two shown) of bores 20 may be formed through the tray member 18 for holding beverage containers (not shown) and the like.

As may best be seen in FIGS. 2 and 3, the invention floor console 10 includes a generally box-like housing portion 22 which is preferably held by conventional fastening means such as screws (not shown) to the floor 14 of the vehicle. A generally hollow upper portion 24 includes a generally forwardly facing aperture such as a slot 26 formed through a front wall 28 and defines an internal cavity 30.

The article-carrying tray 18 is preferably formed as a rectangular member having at least a flat, upper surface 32 for supporting articles, which surface may be modified as by the bores 20 for accommodating certain articles. The tray 18 is slidably received through the slot 26 into the cavity 30, its travel being guided between upper and lower internal walls 34, 36, respectively, of the console housing upper portion 24 partially bounding the cavity 30. Lateral guiding of the tray 18 may be effected by provision of a decorative guiding bezel 38 carried within the periphery of the slot 26 and including inwardly extending guide flanges 40.

Because of the described sliding engagement of the tray 18 with the console upper portion 24, the tray 18 may be moved from the operative position shown in FIGS. 2 and 3 in which the upper supporting surface 32 is exposed inwardly to a hidden stored position indicated in broken lines at the right side of FIG. 2.

The reverse of this sliding movement is, of course, also possible and is assisted by provision of a helical torsion spring 41 operatively carried between the tray 18 and the console housing 22. The radially outer end 44 of the spring 41 is fixed to an anchor, such as a pin 46, mounted on the bottom wall 36 at an axially forward position; and the radially inner end 48 of the spring 41 is fixed to a pin 50, which is formed to abut bottom wall 36 for guiding tray 18. It can be seen that inward movement of the tray 18 extends the spring 41 to create an outward restoring force.

It can be appreciated by reference to FIGS. 3 et seq. that secure positioning of the tray 18 in its stored position is effected by a new latch assembly 42 mounted on bottom wall 36 of console upper portion 24. As will be later described in more detail, the latch assembly 42 cooperates with a pin 45 projecting downwardly from a lower surface 47 of the tray 18 to axially secure the tray 18 within the console 10 upon inward movement to a predetermined axial position and to release the tray 18 for outward movement to its operative position after certain further inward movement.

The latch assembly 42 is illustrated as comprising a base plate 47 fixedly secured to bottom wall 36 as by rivets 51, a pivot pin 52 projecting upwardly from the base plate 47, upper and lower cam members 54 and 56, respectively, relatively rotatably mounted on the pin 52, a locking cam 58, a resilient support 60 to which locking cam 58 is fixed, and a positioning stop 62 for the support 60.

The upper cam 54 and lower cam 56 include peripherally spaced surfaces which cooperate mutually and with the latch pin 45 of the tray 18 to control engagement of the locking cam 58 with the cams 54, 56 upon certain axial movement of the tray 18.

Upper cam 54 is formed as a disc-like member and includes a radially inwardly extending slot 64 configured to receive the actuating pin 45. It is formed to include an open, peripherally extending sector 66 bounded by first and second flat, preferably vertical surfaces 68, 70, respectively. It will be noted that first vertical surface 68 projects downwardly below the plane of an annular bottom surface 72 of upper cam 54, and a canted cam surface 74 extends therefrom to the bottom surface 72.

Lower cam 56 is similarly formed as a disc-like member including an open sector 76 bounded on one end by a cam surface 78, preferably canted identically with cam surface 74, extending generally downwardly from the cam member upper surface 80 which abuts bottom surface 72 of upper cam 54. It is bounded on the other end by a vertical surface 82. An upstanding dog 84 projects from the upper surface 80 into the open sector 66 of upper cam 54. Radially extending side surfaces 86, 88 are formed on the dog 84 complementary with surfaces 68, 70, respectively, of upper cam 54.

The resilient support 60 is preferably formed from a strip of resilient material, such as spring steel, as a generally U-shaped member fixed to the base plate 47 and including an arm 90 extending radially inwardly toward the axis of pivot pin 52 to position locking cam 58 within the common periphery of upper and lower cams 54, 56. Upward travel of the arm 90 is limited by abutment with an overhanging portion 92 of position stop 62, which is also fixed to the base plate 47.

Locking cam 58 is formed as a block fixedly carried at or near the inward end 94 of resilient support 60 and includes a preferably vertical surface 96 complementary with surface 68 of upper cam 54 and a cam surface 98 complementary with surface 78 of lower cam 56.

Operation of the latch assembly 42 of the invention console 10 can be clearly seen in FIGS. 5-9. In the latched position shown in FIG. 5 inward movement of the tray 18 causes engagement of the latch pin 45 in the slot 64 of upper cam member 54 to rotate the cam member 54 to the position shown wherein the open sectors 66, 76 register and the locking cam 58 is in its full upward position. Outward movement of the tray 18 is resisted since the flat surface 96 of locking cam 58 is thereby abuttingly engaged by surface 68 of upper cam member 54.

Figure 4:
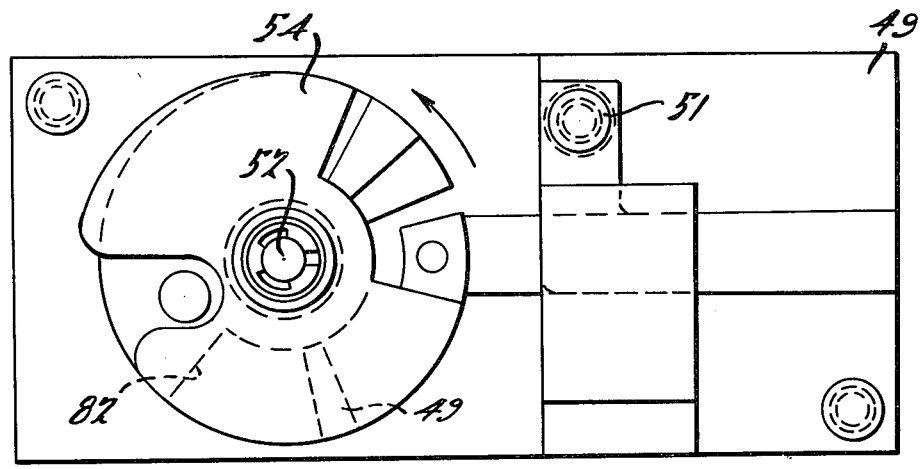
FIG. 4 is a top view of the latch of the invention console.
Figure 5:
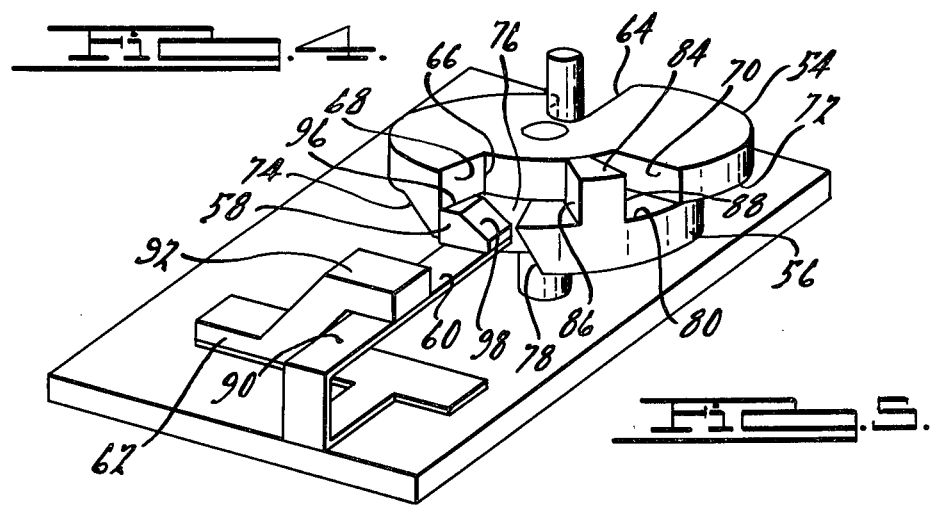
FIG. 5 is a pictorial perspective view of the latch embodied in the invention console showing the relative position of its parts in the latched position.
Figure 6:
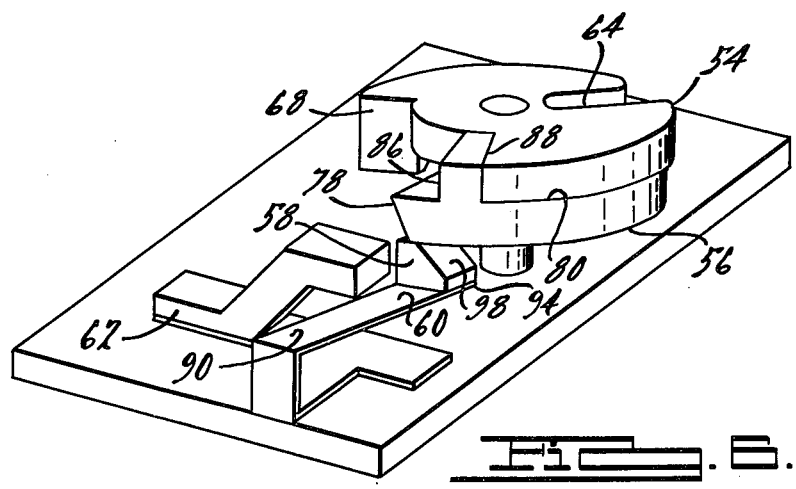
FIG. 6 is a pictorial perspective view of the parts when the tray is positioned fully inward for unlatching.
Figure 7:
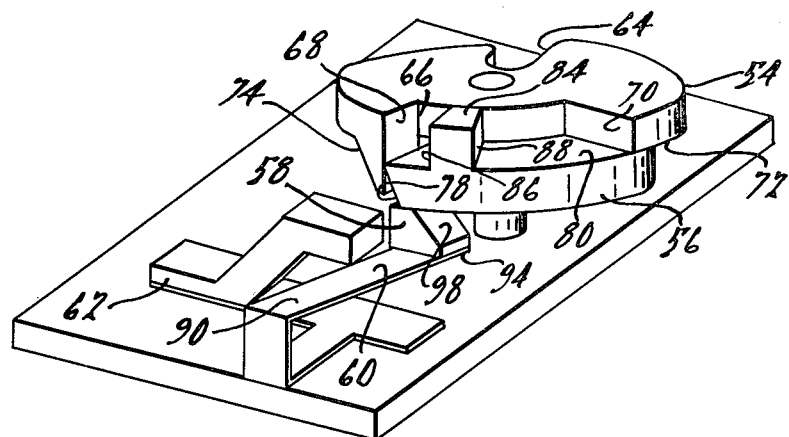
FIG. 7 is a pictorial perspective view of the parts as the tray is moved outwardly.

Upon further inward movement of the tray 18, the latch pin 45 further rotates the upper cam member 54 to the position shown in FIG. 6 as surface 70 of upper cam member 54 engages surface 88 of lower cam dog 84 to rotate lower cam member 56 for engagement of complementary canted surfaces 78 of lower cam member 56 and 98 of locking cam 58. This depresses the arm 90 of support 62, disengaging the locking cam 58 and permitting forward movement of the tray 18 through counter-rotation of the upper cam member 54 as seen in FIG. 7. The extent of inward movement of the tray 18 is limited by provision of an upstanding stop projection 49 of base plate 47 which limits rotation of the lower cam 56 as may best be seen in FIG. 4.

Figure 8:
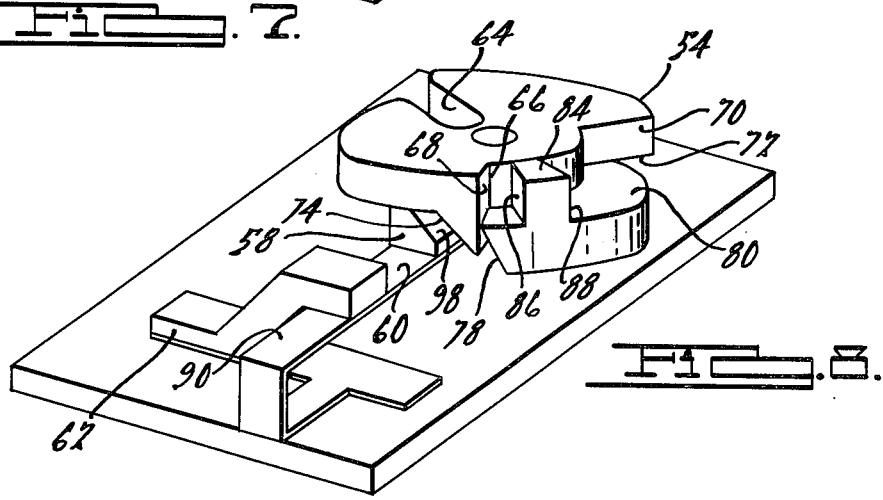
FIG. 8 is a pictorial perspective view of the latch embodied in the invention console showing the relative position of its parts when the outward moving tray is free of the latch.

As the tray moves sufficiently forward so that the pin 45 leaves the slot 64, surface 68 urges the lower cam member 56 to the position shown in FIG. 8 releasing the locking cam 58 to its full upward position beneath upper cam member 54.

Figure 9:
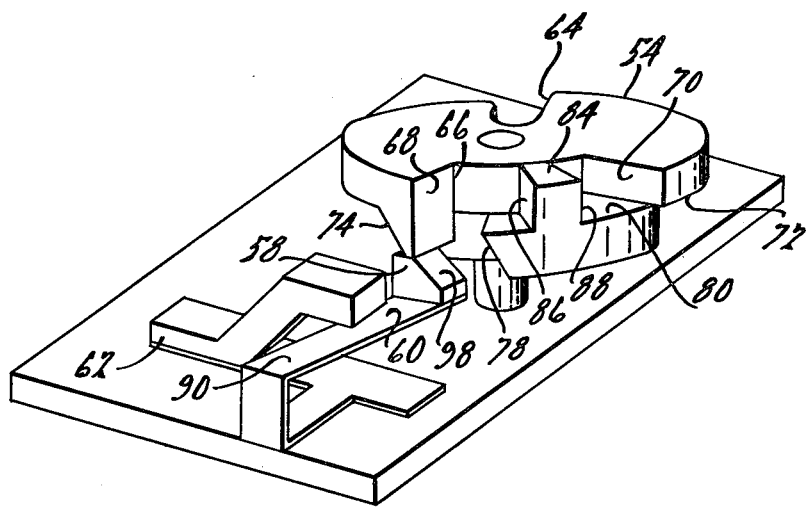
FIG. 9 is a pictorial perspective view of the latch embodied in the invention console showing the relative position of its parts as the tray is moved inward to relatch.

Subsequent inward movement of the tray to a position wherein pin 44 again engages slot 64 rotates the upper cam member 54 to slide canted surface 74 of upper cam member 54 against canted surface 98 of locking cam 58 to depress the arm 90 as shown in FIG. 9 until the latched position of FIG. 5 is again reached.

While only one embodiment of the invention floor console with its novel latch mechanism has been described, those skilled in the art will appreciate that others may be possible without departing from the scope of the appended claims.

INDUSTRIAL APPLICABILITY

It will be obvious from the foregoing that the present invention has industrial applicability in the mounting of article-carrying trays in automotive vehicle bodies and specifically in the construction of floor consoles embodying such trays.

I claim:

1. In a vehicle body passenger compartment having a floor for mounting a pair of seats in laterally spaced relationship about a verticle plane through the longitudinal axis of the vehicle body and including means for mounting an elongated console assembly to the floor in the axially extending space defined between the seats, an improved console assembly characterized in that the console assembly comprises:
   A. elongated housing means including means adapted to engage said mounting means for securing said console assembly to said floor, means defining an internal storage cavity and cover means for covering the internal storage cavity; and
   B. tray means having at least an upwardly facing flat surface carried in said cover means and slidingly movable with respect thereto between a storage position wherein said tray means is substantially enclosed within said housing means storage cavity and an operative position wherein portions of said tray means flat surface are exposed; and
   C. latch means operatively disposed between said tray means and said housing means for selectively holding said tray means in said storage position or permitting movement of said tray means to said operative position.

2. In a vehicle body passenger compartment having a floor for mounting a pair of seats in laterally spaced relationship about a vertical plane through the longitudinal axis of the vehicle body and including means for mounting an elongated console assembly to the floor in the axially extending space defined between the seats, an improved console assembly characterized in that the console assembly comprises:
  A. elongated housing means including means adapted to engage said mounting means for securing said console assembly to said floor, means defining an internal storage cavity and cover means for covering the internal storage cavity; and
  B. tray means having at least an upwardly facing flat surface carried in said cover means and slidingly movable with respect thereto between a storage position wherein said tray means is substantially enclosed within said housing means storage cavity and an operative position wherein portions of said tray means flat surface are exposed; and
  C. spring means operatively disposed between said tray means and said housing means to urge said tray means toward said operative position; and
  D. latch means operatively disposed between said tray means and said housing for selectively holding said tray means in said storage position or permitting movement of said tray means to said operative position.

3. In a vehicle body passenger compartment having a floor for mounting a pair of seats in laterally spaced relationship about a vertical plane through the longitudinal axis of the vehicle body and including means for mounting an elongated console assembly to the floor in the axially extending space defined between the seats, an improved console assembly characterized in that the console assembly comprises:
  A. elongated housing means including means adapted to engage said mounting means for securing said console assembly to said floor, means defining internal storage cavity, and cover means for covering the internal storage cavity;
  B. tray means having at least an upwardly facing flat surface carried in said cover means and slidingly movable with respect thereto between a storage position wherein said tray means is substantially enclosed within said housing means storage cavity and an operative position wherein portions of said tray means flat surface are exposed;
  C. spring means operatively disposed between said tray means and said housing means to urge said tray means toward said operative position; and
  D. latch means carried in said housing means operatively engageable with portions of said tray means to:
    1. upon movement of said tray means substantially to said storage position, prevent movement of said tray means to said operative position; and
    2. upon certain further movement of said tray means in the direction away from said operative position, thereupon permit movement of said tray means to said operative position.

4. An improved console assembly as defined in claims 2 or 3 wherein said spring means comprises a helical torsion spring having one end thereof fixed to said housing means and the other end thereof fixed to said tray means.

5. An improved console assembly as defined in claims 1, 2, or 3 wherein said latch means comprises cam means mounted for rotative movement on said housing means, latching pin means fixed to said tray means for axial movement therewith and engageable with said cam means to effect rotative movement thereof, and locking cam means resiliently mounted on said housing means and selectively moveable in response to predetermined rotative movements of said cam means to prevent or permit further rotative movement of said cam means in the rotative direction effecting movement of said tray means to said operative position.

6. An improved console assembly as defined in claims 1, 2, or 3 wherein said latch means comprises:
  a first substantially disc-like cam means mounted for rotation on said housing means about an axis normal to the plane of said tray means and including means defining a peripherally extending open sector therein;
  a second substantially disc-like cam means having an end face slidingly abuttingly engaging an end face of said first cam means, mounted for relative rotational movement with respect thereto about said axis, and including means defining a peripherally extending open sector therein and means defining a through slot extending radially inwardly from the outer periphery thereof;
  means defining a projection extending from said first cam end face into said second cam open sector;
  a locking cam means;
  means for resiliently supporting said locking cam means adjacent said first and second cam means axis on said housing means and for biasing said locking cam means toward said first and second cam means; and
  latching pin means fixed to said tray means and engageable with said second cam through slot to effect rotation of said second cam means in response to axial movement of said tray means, thereby effecting selective relative rotation of said first and second cam means between a position wherein said locking cam means engages said first and second cam means open sectors to prevent certain movement of said tray means and positions wherein said locking cam means is disengaged from said open sectors and said certain movement is permitted.

7. A console assembly as defined in claims 1, 2, or 3 wherein said latch means comprises:
  first and second disc-like cam means each having means defining a peripherally extending open sector thereof mounted for relative rotary movement on said housing means,
  latch pin means carried for axial movement with said tray means engageable with portions of one of said cam means to effect selective relative movement between said first and second cam means between positions wherein portions of said open sectors of said cam means are in axial registration and positions wherein said open sectors are arcuately displaced, and locking cam means mounted on said housing means and biased toward said cam means to be lockingly inserted into said open sectors in said position of axial registration.

8. A console assembly as defined in claims 1, 2, or 3 wherein said latch means comprises:
  first and second disc-like cam means each having means defining a peripherally extending open sector thereof mounted for relative rotary movement on said housing means, and latch pin means carried for axial movement with said tray means engageable with portions of one of said cam means to effect selective relative movement between said first and second cam means between positions wherein portions of said open sectors of said cam means are in axial registration and positions wherein said open sectors are arcuately displaced.

9. In a vehicle body passenger compartment having an article-receiving tray means slidably mounted in a housing means contained therein for movement between an enclosed storage position and an exposed operative position; an improved means for controlling the movement of said tray characterized in that a latch means is disposed between said tray means and said housing means and is operative to:

A. upon movement of said tray means substantially to said storage position prevent movement of said tray means to said operative position; and B. upon certain further movement of said tray means in the direction away from said operative position, thereupon permit movement to said operative position.

10. Controlling means as defined in claim 9 further characterized in that spring means are operatively disposed between said housing means and said tray means to urge said tray means toward said operative position.

11. Controlling means as defined in claim 10 wherein said spring means comprises a helical torsion spring having one end thereof fixed to said housing means and one end thereof fixed to said tray means.

12. Controlling means as defined in claims 9, 10, or 11 wherein said latch means comprises:

a first substantially disc-like cam means mounted for rotation on said housing means about an axis normal to the plane of said tray means and including means defining a peripherally extending open sector therein;

a second substantially disc-like cam means having an end face slidingly abuttingly engaging an end face of said first cam means, mounted for relatively rotational movement with respect thereto about said axis, and including means defining a peripherally extending open sector therein and means defining a through slot extending radially inwardly from the outer periphery thereof;

means defining a projection extending from said first cam end face into said second cam open sector;

a locking cam means;

means for resiliently supporting said locking cam means adjacent said first and second cam means axis on said housing means and for biasing said locking cam means toward said first and second cam means; and latching pin means fixed to said tray means and engageable with said second cam through slot to effect rotation of said second cam means in response to axial movement of said tray means, thereby effecting selective relative rotation of said first and second cam means between a position wherein said locking cam means engages said first and second cam means open sectors to prevent certain movement of said tray means and positions wherein said locking cam means is disengaged from said open sectors and said certain movement is permitted.

13. A console assembly as defined in claims 9, 10, or 11 wherein said latch means comprises:

first and second disc-like cam means each having means defining a peripherally extending open sector thereof mounted for relative rotary movement on said housing means, latch pin means carried for axial movement with said tray means engageable with portions of one of said cam means to effect selective relative movement between said first and second cam means between positions wherein portions of said open sectors of said cam means are in axial registration and positions wherein said open sectors are arcuately displaced, and locking cam means mounted on said housing means and biased toward said cam means to be lockingly inserted into said open sectors in said position of axial registration.

14. A console assembly as defined in claims 9, 10, or 11 wherein said latch means comprises:

first and second disc-like cam means each having means defining a peripherally extending open sector thereof mounted for relative rotary movement on said housing means, and latch pin means carried for axial movement with said tray means engageable with portions of one of said cam means to effect selective relative movement between said first and second cam means between positions wherein portions of said open sectors of said cam means are in axial registration and positions wherein said open sectors are arcuately displaced.

* * * * *